3,391,078
REGENERATION OF ANION
EXCHANGE RESINS
Karsten Odland, La Grange Park, Ill., assignor to Nalco Chemical Company, Chicago, Ill., a corporation of Delaware
No Drawing. Filed Feb. 8, 1965, Ser. No. 431,178
10 Claims. (Cl. 210—35)

ABSTRACT OF THE DISCLOSURE

A regeneration process for an anion exchange resin wherein said resin is converted from an acid salt form to a completely neutralized form. In the process a lime regenerant is passed in an upward direction through the exhausted resin at a rate high enough to provide a hydraulic expansion of the resin bed. In a preferred embodiment a lime slurry consisting of dissolved lime and lime suspended in an aqueous medium is used as the regenerant. The process avoids the problems of $CaSO_4$ precipitation and lodging in the anion bed. Where a lime slurry is employed, the upward flow of regenerant also prevents undissolved lime from clogging the anion bed.

---

The present invention relates in general to the regeneration of anion exchange resins and to the use of such resins in demineralizing liquids, removing strong acids from nonelectrolytes, weak acids, etc. More particularly, the present invention is directed to an improved process for converting an anion exchange resin from an acid salt form to the completely neutralized form.

Under present practice, water is usually demineralized with an ion exchange system consisting of a cation exchange resin in the hydrogen form and an anion exchange resin in the hydroxide form. The hydrogen ions of the cation resin are exchanged with the metal cations in the raw water, primarily sodium, magnesium and calcium, while the anions in the raw water are exchanged for the exchangeable hydroxide groups of the anion exchange resin. The ultimate result of this dual resin treatment is the replacement in the water of the anions and cations by $H^+$ and $OH^-$.

An improved water treatment process is disclosed in copending application Ser. No. 262,244 which was filed on Mar. 1, 1963, now U.S. Patent No. 3,317,424, the disclosure of which is incorporated herein by reference. In this process, an anion exchange resin in the sulfate form is substituted for the anion exchange resins in the hydroxide form of the prior art. The resultant ion exchange system has several distinct advantages over the prior art hydrogen-hydroxide system, all of which are fully explained in the aforementioned copending application. In general, the cation resin is regenerated to the hydrogen form by the hydrogen ions in sulfuric acid, while the anion of sulfuric acid converts the anion resin to the bisulfate form. The bisulfate can then be further converted or regenerated to the sulfate form by rinsing the resin with raw water of low solids or with demineralized water. In freeing the anion bed of sorbed acids by rinsing with demineralized water, the following reaction takes place

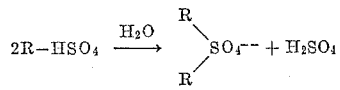

To obtain a 100% conversion of $HSO_4^-$ ions to $SO_4^{--}$ requires a large quantity of water. For this reason it is proposed in copending application Ser. No. 262,244 that part or all of the $H^+$ ions sorbed by the anion resin bed be neutralized with an alkali such as sodium hydroxide, ammonia, etc. Neutralizing the $H^+$ ions results in a saving of time and water as well as increases the capacity of the bed and reduces the discharge of sulfuric acid which otherwise occurs during a subsequent exhaustion cycle.

Although numerous alkaline materials have been used to neutralize the bisulfate molecule, calcium hydroxide (lime) has not been so used despite its low cost. The limited solubility of lime in water (1800 p.p.m. at room temperature) is one reason because the alkali is applied to the anion bed as an aqueous solution. Additionally and more importantly, the use of a lime dispersion or slurry causes the exchange column to become plugged.

It is an object of the present invention to provide an improved method for converting an anion exchange resin in the bisulfate or acid phosphate form to its sulfate or phosphate form wherein lime is used as the neutralizing agent.

Another object of the invention is to provide an improved process for removing acids from solution.

Another object of the invention is to provide an improved method for purifying water with a cation exchange resin in the hydrogen form and an anion exchange resin in the polyvalent salt form, such as the sulfate form.

Other objects will become apparent to those skilled in the art from the following detailed description of the invention.

In general, the present invention comprises the discovery of a method for converting an anion exchange resin from the bisulfate or acid phosphate form to the sulfate or phosphate form and, more particularly, to the use of lime for this purpose. The invention will be described below with respect to the conversion of an anion exchange resin in the bisulfate form to the sulfate form. It should be remembered, however, that the process can also be used to convert an anion resin in the acid phosphate form to the completely neutralized salt.

The use of lime to reduce the water consumption and the amount of rinse water required for neutralization and conversion of the bisulfate to the sulfate form has been hampered by the precipitation of calcium sulfate. The precipitation of calcium sulfate is especially troublesome if raw or reclaimed water containing sulfate or calcium ions is used in making the rinse solution. Such precipitates have to be settled out or filtered out of the solution before it is suitable for further use in neutralizing the anion bed. Furthermore, the maximum solubility of lime in water is approximately 1,800 p.p.m. total alkalinity, as $CaCO_3$, obtained after 24 hours of contact with solid $Ca(OH)_2$.

The precipitation of $CaSO_4$ requires a considerable length of time. If sludge separation by filtration is employed, post-precipitation may occur resulting in solid $CaSO_4$ particles being lodges in the anion bed. During the regeneration of the anion bed with the solution saturated with lime and containing solid $CaSO_4$ particles, the latter will be filtered out by the anion resin during the downflow regeneration process. This results in a build-up of $CaSO_4$ in the anion bed and subsequent discharge of hardness into the finished water during the exhaustion step.

It has been found that these problems of $CaSO_4$ precipitation and lodging in the anion bed can be avoided if the regeneration is conducted with the regenerant being introduced at the bottom of the bed and passing the regenerant in an upflow direction through the resin at a rate high enough to provide an hydraulic expansion of the bed. It has also been discovered that such upflow regeneration permits the application of solid lime particles as the neutralizing agent in addition to the amount of lime already in solution as $Ca(OH)_2$. By running the lime slurry through the bed in the upflow direction, the solid $Ca(OH)_2$ particles are dissolved by the high acidity in the anion bed. Inasmuch as precipitation of $CaSO_4$ does not occur immediately, it is thereby possible to wash all of the calcium out of the bed and keep it free of hardness accumulation.

The upflow of the lime through the bed should be at a rate sufficient to provide an hydraulic expansion of the bed equivalent to a volume increase of at least about 10%. A volume increase of more than 50% would not be practical. In general, the preferred volume expansion of the bed would be from about 20 to 30%, and more preferably about 25%. Backwash with raw water can be continued after lime injection, to approximately 100 p.p.m. excess alkalinity. If desired, a final upflow rinse at zero bed expansion, may be applied at high flow rate before the resin is put back into service. The bed can be held in place hydraulically by a stream of water going through the entire free-board in a downflow direction.

The neutralization of the bisulfates with an alkali proceeds as follows:

$$2(R^+)(HSO_4^-) + OH^- \rightarrow (R^+)_2CO_4^{--} + HSO_4^- + H_2O$$

Unlike the dilution effect produced with water, the use of a lime slurry is not an equilibrium reaction, but proceeds stoichiometrically to completion.

The most predominant cations in raw waters, i.e., river water, lake water, well water, and the like, are sodium, calcium, and magnesium. In some instances, potassium and iron ions are also present in substantial amounts. The most commonly encountered anions in raw water are chloride, sulfate, bicarbonate and nitrate. These anions and cations, as well as any other anions or cations present in raw waters, can be effectively removed by the hydrogen from cation resin and sulfate form of an anion resin.

Briefly, the anion exchange resins used in the practice of the invention are strongly basic anion exchange resins, i.e., anion exchange resins which in the hydroxide form are capable of converting the cations of inorganic or organic salts in aqueous solution directly to hydroxides. Thus, a strongly basic anion exchange resin is capable of converting an aqueous solution of sodium chloride directly to an aqueous solution of sodium hydroxide. A strongly basic anion exchange resin can also be defined as one which on titration with hydrochloric acid in water free from electrolytes has a pH above 7.0 when the amount of hydrochloric acid added is one-half of that required to reach the inflection point (equivalence point). A weakly basic anion exchange resin under the same conditions has a pH below 7.0 when one-half of the acid required to reach the equivalence point has been added. The strongly basic anion exchange resins which are available commercially are characterized by the fact that the exchangeable anion is a part of a quaternary ammonium group. The quaternary ammonium group has the general structure:

wherein $R_1$, $R_2$ and $R_3$ represent alkyl or substituted alkyl groups, and $X^-$ is a monovalent anion.

Examples of the strongly basic anion exchange resins which can be employed in the practice of the invention are those resins disclosed in U.S. Patents, 2,591,573, 2,597,440, 2,597,494, 2,614,099, 2,630,427, 2,632,000 and 2,632,001. Inasmuch as the $SO_4$–$HSO_4$ reaction is independent of the anion resin used, weak base anion exchange resins are also contemplated within the scope of this invention. The commercially available product Dowex 3 is an example of the polyamine-type weak base resin. Such resins usually contain a mixture of primary, secondary, and tertiary amine groups.

The strongly basic insoluble anion exchange resins which are preferably employed for the purpose of the invention are reaction products of a tertiary alkyl amine and a vinyl aromatic resin having halo methyl groups attached to aromatic nuclei in the resin and subsequently converted to the sulfate. Another class of strongly basic anion exchange resins suitable for the practice of the invention are the reaction products of tertiary carbocyclic or heterocyclic amines and vinyl aromatic resins having halo methyl groups attached to aromatic nuclei in the resin and subsequently converted to the sulfate.

The vinyl aromatic resins employed as starting materials in making the anion exchange resins employed in the preferred practice of the invention are the normally solid, benzene-insoluble copolymers of a monovinyl aromatic compound and a polyvinyl aromatic compound containing from 0.5 to 40% by weight, preferably from 0.5 to 20% by weight of the polyvinyl aromatic compound, chemically combined with 99.5% to 60% by weight of the monovinyl aromatic compound. Examples of suitable monovinyl aromatic compounds are styrene, alpha methyl styrene, chlorostyrenes, vinyl toluene, vinyl naphthalene, and homologues thereof, capable of polymerizing as disclosed, for example, in U.S. Patent 2,614,099. Examples of suitable polyvinyl aromatic compounds are divinyl benzene, divinyl toluene, divinyl xylene, divinyl naphthalene and divinyl ethyl benzene. These resins are halo methylated as described, for instance, in U.S. Patent 2,614,099, preferably to introduce an average of 0.2 to 1.5 halo methyl groups per aromatic nucleus in the copolymer and then reacted with a tertiary amine to introduce a quaternary ammonium anion exchange group. Examples of suitable tertiary amines are trimethyl amine, triethyl amine, tributyl amine, dimethyl propanol amine, dimethyl ethanol amine, methyl diethanolamine, 1-methyl-amino-2,3-propane diol, dioctyl ethanolamine, and homologues thereof.

The anion exchange resins can also be prepared by halogenating the molecule of the resin and then introducing an anion exchange group as described in U.S. Patent 2,632,000, and subsequently converting them to the sulfate, with or without admixture with the hydroxide form of the resin.

The preferred anion exchange resins used as starting materials in practicing the invention are Dowex SAR and Dowex SBR. The Dowex SBR is a styrene-divinylbenzene resin containing quaternary amine ion exchange groups in which the three R groups are methyl groups. This resin consists of spherical particles of 20 to 50 mesh and containing about 40% water. The divinylbenzene content is approximately 7.5%. The total exchange capacity is approximately 1.2 equivalents per liter, wet volume. The Dowex SAR is similar to the Dowex SBR except that one of the methyl groups in the quaternary amino salt structure is replaced by a hydroxy ethyl group. The Dowex SBR is somewhat more basic than the Dowex SAR.

The cation exchange resin provides exchangeable hydrogen ions. Resins of this nature are known in the prior art, one of the most common types thereof being a sulfonated resin. Dowex HCR–W is a sulfonated styrene divinyl benzene strongly acid cation exchanger of the type described in U.S. Patent 2,366,007.

Another suitable type of hydrogen form cation exchange resin is a sulfonic acid phenol-formaldehyde resin such as a resin derived by condensing a phenol sulfonic acid with formaldehyde. In general, resins having a plurality of sulfonic acid groups are the most suitable cation exchange resins for purposes of this invention.

WATER DEMINERALIZATION

Briefly, the equilibrium ion exchange systems of the invention are exemplified by the following equations for demineralization of water or other polar liquid containing, by way of example, sodium, calcium and magnesium cations and chloride, sulfate, bicarbonate and nitrate anions. R represents the resins. The longer arrow indicates the predominant reaction in the equilibrium systems.

Demineralization equations

Cations:

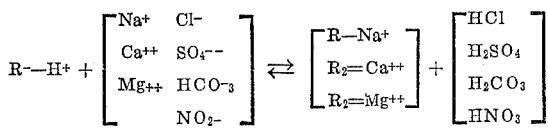

The carbonic acid may decompose in total or in part into water and carbon dioxide gas after it is formed.

Anion:

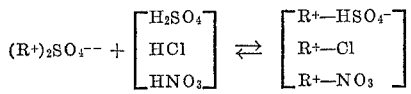

The reaction at an exchange site of the sulfate form anion exchange resin is fostered by the acidity of the aqueous media to convert one exchange site occupied by sulfate ion to bisulfate and sorb an anion in the aqueous phase on the other site. This may be illustrated, as follows, were $H^+X^-$ is the acid in the aqueous phase and $X^-$ is its anion.

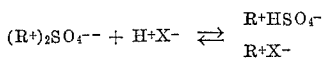

In demineralization of water, $X^-$ may be $Cl^-$, $HSO_4^-$, $NO_3^-$, or $HCO_3^-$.

When strong acids, such as hydrochloric acid, sulfuric acid, and nitric acid, produced as the effluent from the cation exchange resin, are passed downwardly for example, through a bed of such anion exchange resin, the top portion of the bed will be predominantly in the nitrate form, the mid-portion will be predominantly in the chloride form, and the lower portion of the bed will be predominantly in the bisulfate form.

The regeneration of the two resins with aqueous sulfuric acid, followed by neutralization of the anion resin with an aqueous lime slurry, may be exemplified by the following regeneration equations:

Regeneration equations

Cation:

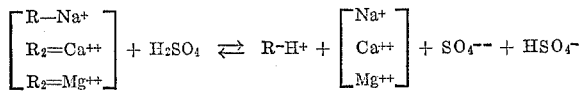

Anion:

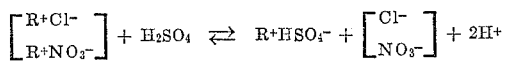

Rinse with lime slurry:

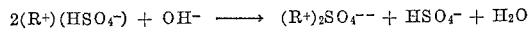

In order to regenerate a bed of anion resin which has been exhausted to the bisulfate form, it is necessary that the lime dispersion (solution or slurry) be passed through the anion bed in an upflow direction, which is countercurrent to the exhaustion flow. In the subject process it is preferable that the exchange resin be employed as a separate bed rather than as a mixed cation-anion bed.

As is pointed out above, calcium hydroxide is soluble in water to the extent of about 1,800 p.p.m. calculated as $CaCO_3$. An equilibrium sets in at this point. If more lime is present a portion of the lime would be in solution and a portion of the lime in suspension. In the subject process, as the lime slurry is passed upward through the anion exchange bed, the lime that is in solution is immediately consumed to neutralize the acid. This allows more lime to go into solution from which it is consumed in converting the bisulfate to the sulfate. The solution discharged at the top of the exchange bed is clear but is supersaturated with calcium sulfate. While calcium sulfate has approximately the same solubility characteristics in water as calcium hydroxide, it has the property of forming a supersaturated solution.

The progressive dissolving of lime does not proceed after the anion resin has been converted to the sulfate form. It is important, therefore, that the solid lime particles be allowed to penetrate the bed of anion resin in order to make them available for neutralization at any strata of the bed. A bed expansion of from 10 to 50%, and preferably 20 to 30%, is sufficient in most instances to allow penetration of the solid lime particles and to assure sufficient contact between the dissolved lime and the resin.

The lime can be passed upwardly through the anion exchange resin as a solution, that is, up to a lime concentration of 1,800 p.p.m. calculated as $CaCO_3$. It is preferred, however, that a lime slurry be employed to neutralize the anion bed. The slurry can contain up to 5,000 p.p.m. of lime. The term dispersion is used herein to indicate both a lime solution and a lime slurry. If a clear solution is used, the solution generally would contain at least about 500 p.p.m. of lime. More dilute solutions could be used but, ordinarily, would not be as satisfactory from an economic standpoint. The preferred concentration range is from 2,000 to 5,000 p.p.m., and the most preferred is 2,500 to 4,000 p.p.m. total alkalinity calculated as $CaCO_3$.

At the present time the best mode contemplated for carrying out the invention involves passing a lime slurry consisting of dissolved lime and lime suspended in an aqueous medium in a concentration range of about 2,000 to 5,000 p.p.m., and preferably 2,500 to 4,000 p.p.m. total alkalinity as $CaCO_3$ upward through the anion exchange resin in the bisulfate form at a flow rate of about one-half gallon per minute of slurry per cubic foot of bed. The flow rate can be varied widely. For example, a flow rate of from 0.25 gallon per minute per cubic foot to 1.0 gallon will be suitable in most instances. The spent solution, which is then a supersaturated and acidic solution of calcium sulfate, is removed from the upper portion of the bed as a clear solution.

As was pointed out above, the subject process can be used wherever it is desired to convert or neutralize an anion exchange bed in the bisulfate form to produce an anion exchange bed in the sulfate form. The invention has been described particularly with respect to the demineralization or purification of brackish water. Other applications, however, are contemplated and specifically in any application where solutions are being demineralized, or are being freed of strong mineral acids, etc.

Obviously many modifications and variations of the invention as hereinbefore set forth may be made without departing from the spirit and scope thereof, and therefore only such limitations should be imposed as are indicated in the appended claims.

I claim:

1. A process for converting an anion exchange bed in the bisulfate form to an anion exchange bed in the sulfate form which comprises: passing an aqueous dispersion of calcium hydroxide in an upward direction through said anion exchange bed, the rate at which said dispersion is passed upwardly through said bed being sufficient to provide an hydraulic expansion of the bed equivalent to a volume increase of at least about 10%.

2. A process for converting an anion exchange bed in the bisulfate form to an anion exchange bed in the sulfate form which comprises: passing a slurry of calcium hydroxide in an upward direction through said anion exchange bed, said calcium hydroxide slurry containing more than 1,800 p.p.m. total alkalinity as $CaCO_3$, the rate at which said slurry is passed upwardly through said bed being sufficient to provide an hydraulic expansion of the bed equivalent to a volume increase of at least about 10%.

3. A process for converting an anion exchange bed in the bisulfate form to an anion exchange bed in the sulfate form which comprises: passing a slurry of calcium hydroxide in an upward direction though said anion exchange bed, said calcium hydroxide slurry containing from 2,000 to 5,000 p.p.m. total alkalinity as $CaCO_3$, the rate at which said slurry is passed upwardly through said bed being sufficient to provide an hydraulic expansion of the bed equivalent to a volume increase of at least about 20 to 30%.

4. A process for removing strong acids from solution which comprises: passing said solution downwardly through an anion exchange resin in the sulfate form whereby the anion exchange resin removes the strong acids from the solution, and thereafter regenerating said anion exchange bed by passing an aqueous dispersion of calcium hydroxide in an upward direction through said anion exchange resin, the rate at which said dispersion is passed upwardly through said bed being sufficient to provide an hydraulic expansion of the bed equivalent to a volume increase of at least about 10%.

5. A process for removing strong acids from solution which comprises: passing said solution downwardly through an anion exchange resin in the sulfate form whereby the anion exchange resin removes the strong acids from the solution, and thereafter regenerating said anion exchange bed by passing an aqueous slurry of calcium hydroxide in an upward direction through said anion exchange resin, said calcium hydroxide slurry containing more than 1,800 p.p.m. total alkalinity as $CaCO_3$, the rate at which said slurry is passed upwardly through said bed being sufficient to provide an hydraulic expansion of the bed equivalent to a volume increase of at least about 20 to 30%.

6. A process for removing strong acids from solution which comprises: passing said solution downwardly through an anion exchange resin in the sulfate form whereby the anion exchange resin removes the strong acids from the solution, and thereafter regenerating said anion exchange bed by passing an aqueous slurry of calcium hydroxide in an upward direction through said anion exchange resin, said calcium hydroxide slurry containing from 2,000 to 5,000 p.p.m. total alkalinity as $CaCO_3$, the rate at which said slurry is passed upwardly through said bed being sufficient to provide an hydraulic expansion of the bed equivalent to a volume increase of at least about 10%.

7. A process for demineralizing water which comprises: bringing water containing salts into contact with both a cation exchange resin in the hydrogen form and an anion exchange resin in the sulfate form, and thereby exchanging the hydrogen ions of said cation exchange resin for the cations of said salts and forming the acids of the anions of said salts; and displacing the sulfate ions on the upper and middle portion of said anion exchange resin with the anions of said salts while simultaneously reabsorbing the displaced sulfuric acid into the lower portion of the bed by converting the sulfate groups on the lower fraction of the resin bed to bisulfate groups, and thereafter converting the bisulfate and other anions on said anion exchange resin to sulfate groups by passing an aqueous dispersion of calcium hydroxide in an upward direction through said anion exchange bed, said calcium hydroxide dispersion containing more than 1,800 p.p.m. total alkalinity as $CaCO_3$, the rate at which said dispersion is passed upwardly through said bed being sufficient to provide an hydraulic expansion of the bed equivalent to a volume increase of at least about 10%.

8. A process for demineralizing water which comprises: bringing water containing salts into contact with both a cation exchange resin in the hydrogen form and an anion exchange resin in the sulfate form, and thereby exchanging the hydrogen ions of said cation exchange resin for the cations of said salts and forming the acids of the anions of said salts; and displacing the sulfate ions on the upper and middle portion of said anion exchange resin with the anions of said salts while simultaneously reabsorbing the displaced sulfuric acid into the lower portion of the bed by converting the sulfate groups on the lower fraction of the resin bed to bisulfate groups, and thereafter converting the bisulfate and other anions on said anion exchange resin to sulfate groups by passing an aqueous slurry of calcium hydroxide in an upward direction through said anion exchange bed, said calcium hydroxide slurry containing more than 1,800 p.p.m. total alkalinity as $CaCO_3$, the rate at which said slurry is passed upwardly through said bed being sufficient to provide an hydraulic expansion of the bed equivalent to a volume increase of at least about 20 to 30%.

9. A process for converting an anion exchange bed in the acid salt form to an anion exchange bed in the completely neutralized form which comprises: passing an aqueous dispersion of calcium hydroxide in an upward direction through said anion exchange bed, the rate at which said dispersion is passed upwardly through said bed being sufficient to provide an hydraulic expansion of the bed equivalent to a volume increase of at least about 10%.

10. A process for converting an anion exchange bed in the acid salt form to an anion exchange bed in the completely neutralized form which comprises: passing a slurry of calcium hydroxide in an upward direction through said anion exchange bed, said calcium hydroxide slurry containing from 2,000 to 5,000 p.p.m. total alkalinity as $CaCO_3$, the rate at which said slurry is passed upwardly through said bed being sufficient to provide an hydraulic expansion of the bed equivalent to a volume increase of at least about 10%.

References Cited

UNITED STATES PATENTS

| | | | |
|---|---|---|---|
| 3,240,699 | 3/1966 | Duff et al. | 210—35 |
| 3,317,424 | 5/1967 | Schmidt | 210—37 X |

SAMIH N. ZAHARNA, *Primary Examiner.*

UNITED STATES PATENT OFFICE
CERTIFICATE OF CORRECTION

Patent No. 3,391,078                                          July 2, 1968

Karsten Odland

It is certified that error appears in the above identified patent and that said Letters Patent are hereby corrected as shown below:

Column 2, line 54, "lodges" should read -- lodged --.
Column 3, line 22, the portion of the formula reading "$CO_4^{--}$" should read -- $SO_4^{--}$ --.

Signed and sealed this 2nd day of December 1969.

(SEAL)
Attest:

Edward M. Fletcher, Jr.                          WILLIAM E. SCHUYLER, JR.
Attesting Officer                                       Commissioner of Patents